UNITED STATES PATENT OFFICE.

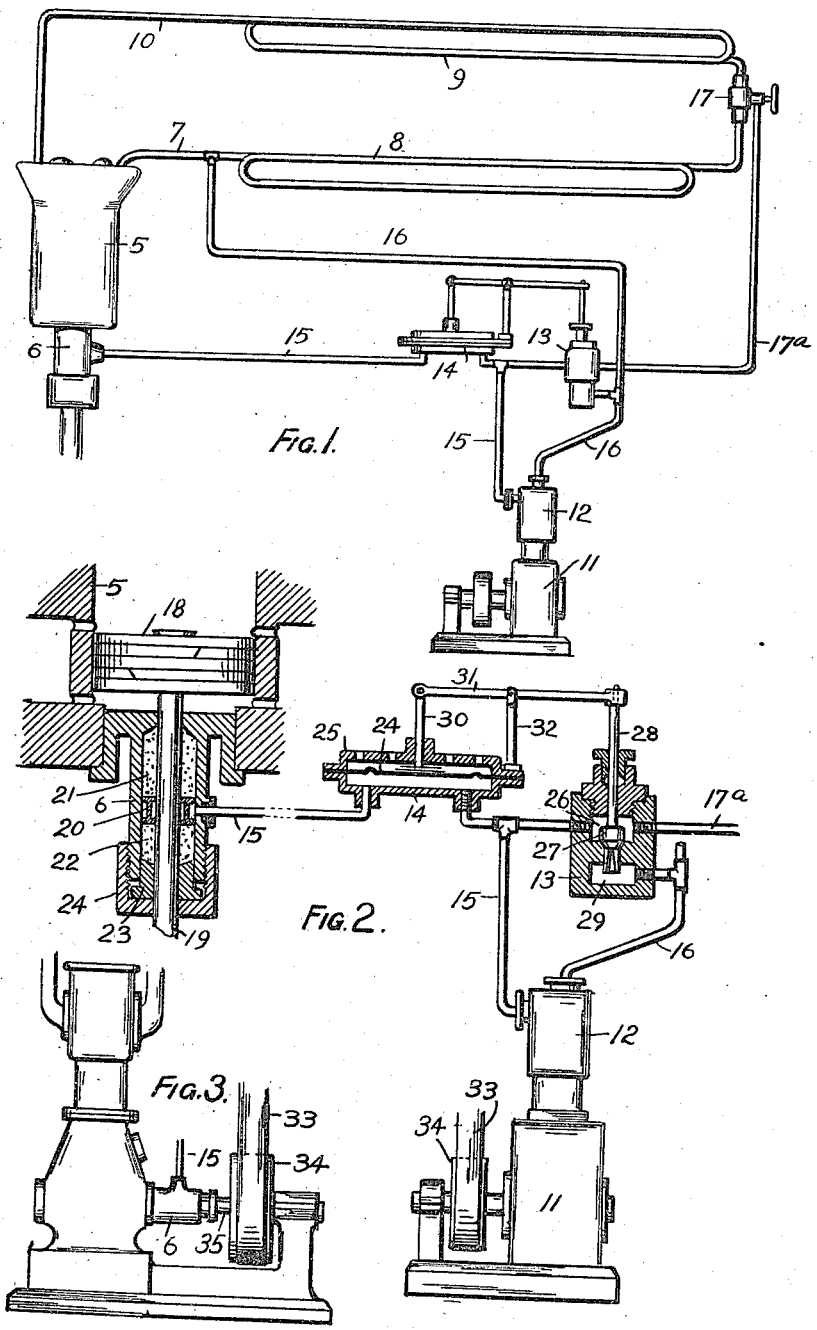

ARTHUR HEANE, OF BLAYNEY, NEW SOUTH WALES, AUSTRALIA.

GAS-COMPRESSION PLANT.

1,268,840.          Specification of Letters Patent.      Patented June 11, 1918.

Application filed March 28, 1917. Serial No. 158,055.

*To all whom it may concern:*

Be it known that I, ARTHUR HEANE, a subject of the King of Great Britain and Ireland, resident at Blayney, in the State of New South Wales, Commonwealth of Australia, have invented certain new and useful Improvements in Gas-Compression Plants, of which the following is a specification.

It is an acknowledged fact that in the compression of gases (particularly ammonia and other volatile gases used in refrigerating processes) a considerable leakage of gas occurs through the packing box of the compressor and where large regulating valves are used through the glands of same, and that such leakage constitutes a large percentage of the total loss of gas.

To diminish the loss it is known practice to provide in a packing box two sets of packing and between them a chamber or "lantern" into which gas escaping past the first packing enters and is trapped. If, however, the gas pressure is greater than atmospheric there is still the risk of it escaping past the second packing, while if the gas pressure is less than atmospheric there is a probability of air being indrawn thus diluting the gas and militating against the efficiency of the plant.

The object of this invention is to provide means whereby the loss of gas from the above causes is greatly diminished and the risk of the indrawing of air into the pipe system is eliminated, such means permitting the use of comparatively loose packing so that friction and wear on piston and valve rods and packing is diminished and the necessity for frequently adjusting the glands is mainly obviated.

With this object in view the invention consists broadly of the combination in a gas compression plant of subsidiary mechanism for reducing to or to about atmospheric pressure, the gas acting on any packing box or packing boxes in said plant and tending to escape therethrough; said subsidiary mechanism comprising a gas compressing or exhausting machine having its suction pipe connected to a lantern in any packing box or packing boxes (or in the case of an inclosed type compressor to the crank case thereof if preferred) and operating to withdraw gas from same and deliver it to the gas circulating system or storage reservoir either through a subsidiary condenser or otherwise.

Owing to fluctuating conditions of working in some plants the maintenance of a suitable pressure in the subsidiary suction pipe may require frequent attention to the subsidiary exhauster, and to obviate this the invention also consists of the combination with the subsidiary mechanism of means for automatically maintaining a practically constant pressure (say one pound per square inch above atmosphere) in the subsidiary suction pipe.

Such last mentioned means comprise a valved connection between the suction and delivery pipes of the subsidiary compressor and means controlled by the pressure in said suction pipe for automatically regulating the opening of said valved connection so that in the event of the pressure in the suction pipe falling below the predetermined minimum delivery pressure is admitted to the suction pipe to restore the pressure therein whereupon the valved connection automatically closes.

This automatic suction pressure regulator may consist of a differential piston valve, the larger piston subjected to the pressure in the suction pipe and the smaller piston to the pressure in the delivery pipe. Alternatively the valve may be controlled by the normal or greater suction pressure acting in a spring tube similar to that in the well known Bourdon pressure gage and connected to the valve spindle. As a further alternative the valve may be controlled by a float in a vessel containing liquid (preferably mercury) and in communication with a vertical tube open to the atmosphere at the top while the surface of the liquid in the vessel is subjected to the suction pressure so that as the latter falls the liquid rises in the vessel and the float operates to open the valve.

The means preferred as being quick in action consists of a diaphragm plate subjected on one side to the suction pressure and on the other to atmospheric pressure, the flexure of said diaphragm under normal suction pressure operating to close the valve while reverse flexure under reduced suction pressure releases the valve which is opened by the delivery pressure.

The invention is not confined in its application to plants comprising main compressors or valves originally provided with lanterns in their packing boxes, as a plain packing box may be so modified as to provide an equivalent chamber about the rod or shaft passing therethrough; and in this specification the word "lantern" is intended where used to mean any such chamber adapted for the purpose.

In the accompanying drawings depicting a practical application of the invention embodying the last mentioned and preferred automatic controlling means:—

Figure 1 is a diagrammatic plan of a gas compression plant for refrigerating purposes having a main compressor with reciprocating piston rod and embodying this invention;

Fig. 2 a sectional elevation on a larger scale of one end of the main compressor and of the suction pressure controlling device, the subsidiary compressor being shown in elevation and the whole in diagrammatic arrangement; and Fig. 3 is a diagrammatic elevation of an inclosed type of compressor showing the subsidiary suction pipe connected to the packing box about the rotating crank shaft; but it is to be understood that said suction pipe may be connected directly to the crank case, and that such arrangement is to be considered as within the scope of this invention.

In Fig. 1, 5 represents the main compressor cylinder, 6 the packing box thereof, 7 the delivery pipe, 8 the condenser coils, 9 the expansion coils and 10 the main suction pipe; while 11 represents the subsidiary compressor, 12 the cylinder thereof, 13 the control valve casing, 14 the diaphragm casing, 15 the subsidiary suction pipe, 16 the subsidiary delivery pipe, and 17 a valve with the lantern of its packing box connected by pipe 17ª to the control valve casing.

Referring to Fig. 2 the main compressor cylinder 5 of known type is fitted with a piston 18 on a rod 19 passing through the packing box 6 provided with a lantern 20 and fitted with a gland 23 and gland nut 24, said lantern being arranged between the inner and outer sets of packing indicated respectively by 21 and 22. The suction pipe 15 of the subsidiary compressor is connected to said lantern and communicates with the diaphragm casing 14 in which is a diaphragm plate 24 exposed on the opposite side to atmospheric pressure admitted through the perforated cover 25. The suction pipe 15 also communicates with the chamber 26 of valve casing 13 and is coupled to the suction pipe of the subsidiary compressor cylinder 12. In the casing 13 is a valve 27 mounted on a stem 28 and normally closing communication between the chamber 26 and a chamber 29 which is in communication with the delivery pipe 16. Bearing on the atmospheric side of the diaphragm-plate 24 is a spindle 30 pivotally connected to one end of a lever 31 pivoted on a fulcrum 32 and freely pivoted at its other end to the valve stem 28.

A lantern in the packing box of valve 17 (Fig. 1) is also in communication through pipe 17ª with chamber 26 of the valve casing 13.

In Fig. 3 the suction pipe 15 of the subsidiary compressor 11 is connected to the packing box 6 through which passes the rotatable crank shaft 35.

The subsidiary compressor is actuated by means of the belt 33 and pulley 34, though it is to be understood that any appropriate mechanical means may be employed for this purpose.

Such valves or taps as are required for temporarily shutting off the subsidiary mechanism or any portion of it may be provided where convenient.

It is to be understood that the lantern to which the subsidiary suction pipe is connected may be additional to another lantern or lanterns provided to retain a film of oil as in known practice, but such other lantern is in most cases unnecessary.

In operation, the subsidiary compressor of appropriate type is run at a suitable speed to maintain as nearly as is possible in the suction pipe 15 and lantern 20 and in the lanterns of such valves (as 17) as are provided with same, a constant suction pressure of slightly above atmospheric, so that gas passing the inner packings and entering said lanterns is withdrawn therefrom by the subsidiary compressor and delivered through the pipe 16 to any appropriate and convenient point in the gas circulating system. The diaphragm plate 24 is designed to be flexed by the minimum predetermined pressure or any greater pressure and operate through spindle 30 lever 31 and valve stem 28 to retain the valve 27 on its seat against the delivery pressure in pipe 16 and chamber 29. Should, however, the pressure in pipe 15 fall below atmospheric pressure (through variation of speed of the subsidiary compressor or other causes) and thereby create a tendency for the subsidiary compressor to draw in air through the outer packing 22, the diaphragm plate instantly flexes reversely and releases the valve 27 which thereupon opens and communication is established between the suction and delivery pipes 15 and 16 respectively to restore the pressure in the former. Thereupon the valve 27 is again closed by the action of the diaphragm.

What I claim as my invention is:—

1. In a gas compression plant, a main compressor and in combination therewith a subsidiary exhausting machine having a suction pipe connected to said main compressor to reduce the gas pressure on the gland packing thereof and means for actuating said exhausting machine, and means for maintaining a normal working pressure in said suction pipe comprising a connection between said suction pipe and the pipe carrying pressure in excess of said normal pressure, and a valve in said connection maintained in closed position by said normal working or greater pressure, said valve being capable of opening upon reduction of pressure in said suction pipe.

2. In a gas compression plant comprising a main compressor and a gas regulating valve having a lantern in its packing box, a subsidiary exhausting machine having its suction pipe connected to said main compressor and valve lantern to reduce the gas pressure on the gland packing thereof, and means for actuating said subsidiary exhausting machine.

3. In a gas compression plant, a subsidiary exhausting machine having its suction pipe connected to the main compressor to reduce the gas pressure on the gland packing thereof, means for actuating said exhausting machine, and means for maintaining a normal working pressure in said suction pipe comprising a connection between said suction pipe and the pipe carrying pressure in excess of said normal pressure, and a valve in said connection maintained in closed position by said normal working or greater pressure, said valve being capable of opening upon reduction of pressure in said suction pipe.

4. In a gas compression plant comprising a main compressor and a gas regulating valve having a lantern in its packing box, a subsidiary exhausting machine having its suction pipe connected to said main compressor and valve lantern for the purpose specified, means for actuating said exhausting machine, and means for automatically maintaining a predetermined pressure in said suction pipe to prevent indrawing of air.

5. In a gas compression plant comprising a main compressor having a packing box and a lantern therein, the combination with such main compressor of a subsidiary exhauster having its suction pipe connected to said lantern, means for actuating said exhauster for the purpose specified, and means for maintaining a normal working pressure in said suction pipe comprising a connection between said suction pipe and the pipe carrying pressure in excess of said normal pressure, and a valve in said connection maintained in closed position by said normal working or greater pressure, said valve being capable of opening upon reduction of pressure in said suction pipe.

6. In a gas compression plant comprising a main compressor having a packing box and a lantern therein, the combination with such main compressor of a subsidiary compressor having its suction pipe connected to said lantern and its delivery pipe connected to the main gas circulating system, means for actuating said subsidiary compressor for the purpose specified, and means for maintaining a normal working pressure in said suction pipe comprising a connection between said suction pipe and the pipe carrying pressure in excess of said normal pressure, and a valve in said connection maintained in closed position by said normal working or greater pressure, said valve being capable of opening upon reduction of pressure in said suction pipe.

7. In a gas compression plant comprising a main compressor having a packing box and a lantern therein, the combination with said main compressor of a subsidiary compressor having its suction pipe connected to said lantern and its delivery pipe connected to the main gas circulating system, means for actuating said subsidiary compressor, a connection between said suction and delivery pipes, a valve in said connection, and means regulated by the pressure in said suction pipe for controlling said valve, as and for the purpose specified.

8. In a gas compression plant comprising a main compressor having a packing box and a lantern therein, the combination with said main compressor of a subsidiary compressor having its suction pipe connected to said lantern and its delivery pipe connected to the main gas circulating system, means for actuating said subsidiary compressor, a connection between said suction and delivery pipes, a valve in said connection, a diaphragm plate subjected on one side to the pressure in the subsidiary suction pipe and mechanical connection between said diaphragm and valve whereby the movement of the former under varying pressures controls the action of said valve as and for the purpose specified.

9. In a gas compression plant comprising in combination a main compressor, a subsidiary compressor connected to a lantern in the packing box of the main compressor, and means for actuating the latter to draw gas from a lantern of the main compressor, a valve casing having a chamber in communication with the subsidiary suction pipe and a chamber in communication with the subsidiary or main delivery pipe, a passage between said chambers, a valve in said passage, a diaphragm plate subjected on one side to the pressure in said suction pipe and to atmospheric pressure on the other, and mechanical connection between said diaphragm plate and valve whereby the movement of the former under varying pressures controls the said valve as and for the purpose specified.

Signed at Sydney, in the State of New South Wales, Commonwealth of Australia, this fourteenth day of February, A. D. 1917.

ARTHUR HEANE.

Copies of this patent may be obtained for five cents each, by addressing the "Commissioner of Patents, Washington, D. C."